UNITED STATES PATENT OFFICE 2,050,958

3-HYDROXYDIPHENYLENEOXIDE-2-CARBOXYLIC ACID

Friedrich Muth, Leverkusen-I. G.-Werk, Germany, assignor to General Aniline Works, Inc., New York, N. Y., a corporation of Delaware No Drawing. Application September 25, 1933, Serial No. 690,951. In Germany October 5, 1932

1 Claim. (Cl. 260—54)

The present invention relates to new ortho-hydroxycarboxylic acids of the diphenylene series, more particularly it relates to the compound of the formula:

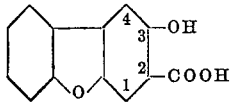

In accordance with the present invention the compound of the above identified formula is prepared by starting with the 3-hydroxydiphenyleneoxide and treating it according to the synthesis of Kolbe in the presence of an alkali, or in form of an alkali metal salt thereof, with carbondioxide under superatmospheric pressure and at elevated temperature.

From the chemical behaviour of my new carboxylic acid it appears that the carboxylic acid group stands in ortho-position with respect to the hydroxy group, and from my present knowledge I assume that it enters the 2-position; I wish it to be understood, however, that, in case the carboxylic acid group should enter the other position ortho with respect to the hydroxy group, that is the 4-position, this compound falls within the scope of my invention.

The starting 3-hydroxydiphenyleneoxide is obtainable for example, by treating the corresponding 3-chloro-compounds with caustic aqueous alkali at elevated temperature and under superatmospheric pressure, or by diazotizing the corresponding 3-amino-compound and boiling the diazo compound obtained therefrom in the presence of phosphoric acid.

My new ortho-hydroxycarboxylic acid is a water-insoluble pale yellow-colored substance, soluble in aqueous alkalies and organic solvents and is a valuable intermediate product in the manufacture of dyestuffs.

The invention is illustrated by the following examples, without being limited thereto:

Example 1.—18.4 parts by weight of 3-hydroxydiphenyleneoxide are transformed into the potassium salt according to methods known per se. The potassium salt is ground with 60 parts by weight of potassium carbonate, the mixture is introduced into an autoclave, carbondioxide is forced in and the autoclave is heated during 8–10 hours at 210–220° C. After cooling, the carbon dioxide is removed, the content of the autoclave is dissolved in hot water and filtered. On cooling, from the filtrate crystallizes the potassium salt of the 3-hydroxydiphenyleneoxide-2-carboxylic acid in needles. The salt is filtered with suction, again dissolved in hot water, and the free acid is precipitated by the addition of hydrochloric acid. The new acid having the following formula:

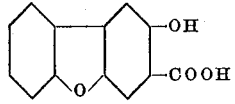

is obtained after recrystallization from pyridine in pale yellow needles of the melting point 293° C. On the addition of ferric chloride to its alcoholic solution, a reddish-blue coloration enters.

Example 2.—20 parts by weight of 3-hydroxydiphenyleneoxide are intimately mixed with 100 parts by weight of dry potassium carbonate, and the mixture is introduced into an autoclave. Then carbon dioxide is pressed in, the temperature is raised to 150° C. in the course of 5–6 hours and kept at this temperature for about 10–12 hours. After cooling, the carbon dioxide pressure is removed, the content of the autoclave is dissolved in hot water, the solution is filtered, and the filtrate is evaporated until crystallization of the potassium salt begins. The further working up is performed as described in Example 1. The carboxylic acid obtained is identical with that described in Example 1.

I claim:

3-hydroxydiphenyleneoxide-2-carboxylic acid of the formula:

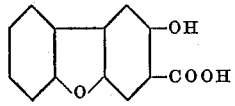

being a pale yellow crystalline substance of the melting point 293° C. and being a valuable intermediate product in the manufacture of dyestuffs.

FRIEDRICH MUTH.